(No Model.) 2 Sheets—Sheet 1.
C. J. P. HEIM.
CABLE RAILWAY.
No. 371,064. Patented Oct. 4, 1887.
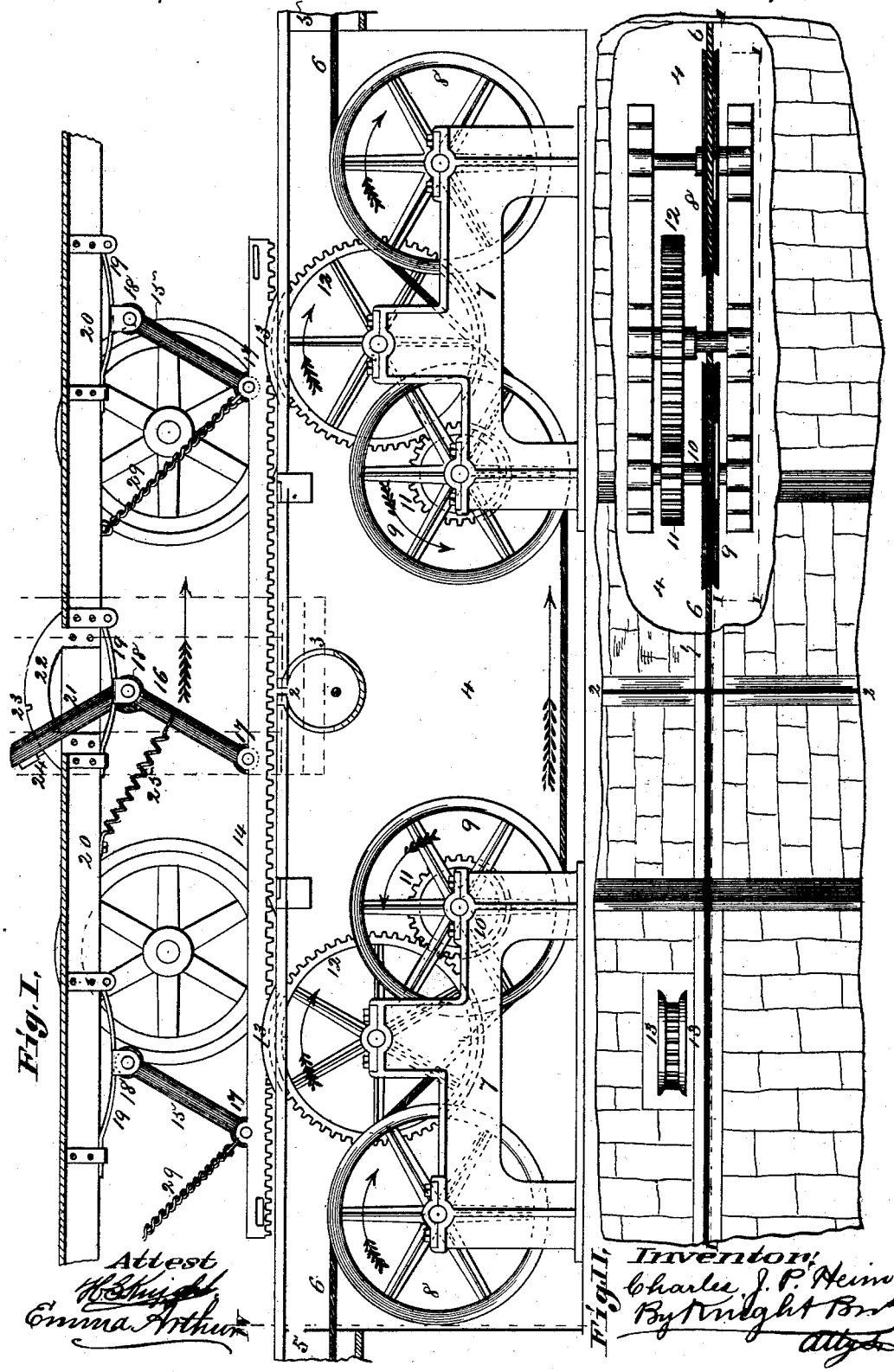
Fig. I.
Fig. II.
Attest
H. Knight
Emma Arthur
Inventor:
Charles J. P. Heim
By Knight Bros
Attys

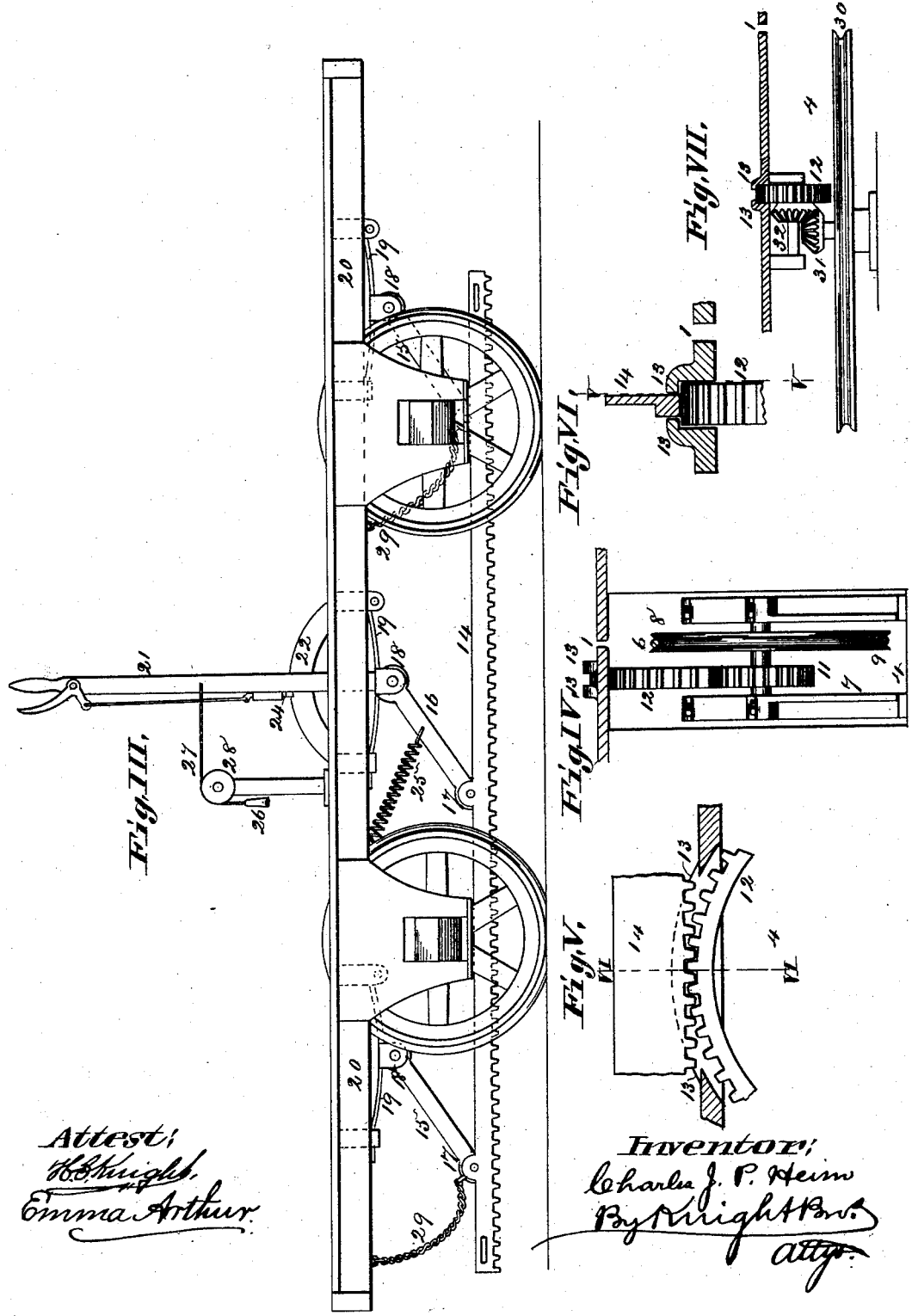

UNITED STATES PATENT OFFICE.

CHARLES J. P. HEIM, OF ST. LOUIS, MISSOURI.

CABLE RAILWAY.

SPECIFICATION forming part of Letters Patent No. 371,064, dated October 4, 1887.

Application filed April 2, 1887. Serial No. 233,435. (No model.)

*To all whom it may concern:*

Be it known that I, CHARLES J. P. HEIM, of the city of St. Louis, in the State of Missouri, have invented a certain new and useful Improvement in Cable Railways, of which the following is a full, clear, and exact description, reference being had to the accompanying drawings, forming part of this specification.

The improvement relates to a device for driving cars over crossing tracks; and it consists of a movable cog-rack on the car, which is engaged by a cog-wheel driven by the line cable.

Figure I is a vertical longitudinal section at I I, Fig. II. Fig. II is a plane, with part of the pavement, &c., removed to show the machinery beneath. Fig. III is a side view of the lower portion of a car, showing the rack and its attachments. Fig. IV is a cross-section of the conduit at IV IV, Fig. I. Fig. V is a vertical longitudinal section at V V, Fig. VI. Fig. VI is a detail transverse vertical section at VI VI, Fig. V. Fig. VII is a vertical transverse section of a conduit, showing a modification of the actuating mechanism of the drive-wheel.

1 is the grip-slot of the line, which I shall call the "main" line for convenience, being the line to which my improvement is applied. The grip-slot of the crossing line is marked 2.

3 is the conduit of the crossing line, and 4 is a chamber in the main line in the course of the conduit 5 of the line.

6 is the cable of the main line.

7 7 are similar frames, each frame giving bearing to two grooved pulleys, 8 and 9. The cable passes over each of the pulleys 8 and beneath each of the pulleys 9. (See Fig. I.) By this means the cable 6 is carried beneath the conduit 3 of the cross-line.

Upon the shaft of one of the grooved pulleys of each set—say the shafts 10 of the pulley 9—is a cog-pinion, 11, which engages with a cog-wheel, 12, whose periphery is exposed to the street, but protected by guards 13, so that vehicle-wheels will not be liable to come in contact with it. It will be seen that the grip must be released from the cable before it strikes the pulley 8; and my invention consists of a device for carrying the grip-car over the cross-track into position to grip the cable at the other side of the cross-track.

14 is a movable cog-rack extending lengthwise of the car and supported on links 15 and 16. These links are connected at their lower ends to the rack by joints 17, and at the upper ends are jointed at 18 to springs 19, whose ends are secured to the longitudinal timber 20 of the car. One of the links—say 16—forms the arm of a hand-lever, 21, working beside a guide-bar, 22, having a notch, 23, which is entered by a drop-catch, 24, when the lever is in the position shown in Fig. III, and the rack is in its upper position, as seen in this figure.

25 is a spring tending to lift the rack 14.

26 is a stirrup supported on a cord, 27, attached to the hand-lever 21, and passing over a pulley, 28. This stirrup gives means for the driver to pull the lever 21, and thus apply the rack to the cog-wheel 12 by his foot when his hands are otherwise occupied.

29 are stay or brace chains extending from the timber 20 to the rack. These chains prevent the rack descending below a certain point. (See Fig. I.) It will be seen that the cog-wheels 12 push the rack in the direction of the arrow and drive the car forward. If the car is at rest or moving slowly when the rack first engages the cog-wheel 12, the connecting-springs 19 will be forced upward, and so the breaking of the cogs would be avoided, as the force of the impingement would be lessened, by the combined upward and forward movement of the links and rack. It will be seen, however, that the peripheral speed of the cog-wheel 12 will be less than that of the cable if the mechanism is constructed as shown, for the cog-wheel 12 would only rotate once to two rotations of the pulley 9, while the diameters are about equal. I do not confine myself to any particular relative speed between the cable and the periphery of the cog-wheel, but would never make the latter to exceed the former.

The modification in Fig. VII shows the wheel 12 driven by a horizontal cable-pulley, 30. In this case miter-wheels are used, one, 31, being on the shaft of pulley 30, and the other, 32, being on the shaft of the wheel 12.

I have shown the miter-wheels above the horizontal pulley 30; but these miter-wheels may be located below the pulley and suitable gearing used to convey motion to the wheel 30.

Friction-gearing may be substituted between the wheels 11 and 12 or 31 and 32, which would relieve the cogs of the wheel 12 and rack 14 by slipping, in case of extreme strain, when they first become engaged.

It will be seen that the springs 19 allow the rack 14 to retain its relative position to the cog-wheel 12 in the vertical movement of the car resulting from its passage over the cross-track or other small obstructions.

I claim as my invention—

1. The combination of the cable of a cable railway, a pulley turned by the cable, a cog-wheel actuated by the pulley journaled beneath the surface of the street and having only a small portion of its periphery exposed above the surface of the street, and a cog-rack on a car, constructed to engage said cog-wheel, for the purpose set forth.

2. The combination of the cable of a cable railway, the pulleys 8 and pulleys 9, conveying the cable to a lower level, a cog-wheel turned by connection with one of the pulleys and having part of its periphery exposed at the surface of the railway, and a cog-rack movable on a car and constructed to engage the cog-wheel, for the purpose set forth.

3. In a cable railway, the combination, with the conduit and the cable running therein, said conduit being crossed by another conduit, of pulleys for conveying the cable below the plane of the cross-conduit, a pinion actuated by the cable through the medium of suitable gearing, said pinion being journaled beneath the surface of the road and having only a small portion of its periphery exposed through a slot opening into the conduit from the surface of the road, substantially as set forth.

4. In a cable railway, a cog-rack extending endwise of the car and pivoted links for suspending said bar from the car, whereby it is allowed vertical movement and adapted to engage a cog-wheel beneath, substantially as and for the purpose set forth.

5. In a cable-car, a vertically-movable cog-rack supported on inclined links and connected to the body by stays to arrest the forward movement of the rack when in its depressed position, substantially as set forth.

6. The combination, in a cable-car, of a vertically-adjustable cog-rack extending lengthwise of the car, links by which the rack is supported, and springs by which the links are connected to the car, for the purpose set forth.

7. The combination, in a cable-car, of the cog-rack 14, the links 15, the lever 21, connected to the rack by arm or link 16, the springs 19, and the stays 29, substantially as and for the purpose set forth.

8. The combination, in a cable-car, of the cog-rack 14, the links 15, the springs 19, the lever 21, connected to the rack and fulcrumed to the car, the stays 29, and the rack-lifting spring 25, substantially as and for the purpose set forth.

9. The combination, in a cable-car, of the cog-rack 14, links 15, springs 19, lever 21, and stirrup 26, connected to the lever, substantially as and for the purpose set forth.

CHAS. J. P. HEIM.

Witnesses:
SAML. KNIGHT,
BENJN. A. KNIGHT.